(12) United States Patent
Seksaria et al.

(10) Patent No.: US 7,815,249 B2
(45) Date of Patent: Oct. 19, 2010

(54) LIGHTWEIGHT HYBRID MATERIAL TRUCK HOOD

(75) Inventors: Dinesh C. Seksaria, Novi, MI (US); Russell Long, Murrysville, PA (US)

(73) Assignee: Alcoa Inc., Pittsburgh, PA (US)

( * ) Notice: Subject to any disclaimer, the term of this patent is extended or adjusted under 35 U.S.C. 154(b) by 951 days.

(21) Appl. No.: 11/467,627

(22) Filed: Aug. 28, 2006

(65) Prior Publication Data
US 2008/0048471 A1  Feb. 28, 2008

(51) Int. Cl.
B62D 25/12 (2006.01)
(52) U.S. Cl. .......................... 296/193.11; 296/193.09; 296/203.02
(58) Field of Classification Search ............ 296/193.09, 296/193.11, 203.02, 193.1, 187.09, 190.05, 296/190.06, 198; 180/69.2, 69.21, 89.14; 280/848, 154
See application file for complete search history.

(56) References Cited

U.S. PATENT DOCUMENTS

| | | | |
|---|---|---|---|
| 3,618,692 A * | 11/1971 | Stikeleather ............ | 180/89.14 |
| 4,971,172 A | 11/1990 | Hoffman et al. | |
| 5,054,567 A * | 10/1991 | Hoffman ................. | 180/68.2 |
| 5,101,921 A | 4/1992 | West et al. | |
| 5,115,878 A | 5/1992 | Hayata | |
| 5,499,690 A * | 3/1996 | Shearn et al. ............ | 180/68.4 |
| 5,605,371 A * | 2/1997 | Borchelt et al. ........ | 296/187.09 |
| 5,975,228 A * | 11/1999 | Parfitt ..................... | 180/69.21 |
| 6,206,122 B1 | 3/2001 | Boothman et al. | |
| 6,241,039 B1 * | 6/2001 | Jarnstrom et al. ........ | 180/69.21 |
| 6,422,643 B1 * | 7/2002 | Pease ...................... | 296/193.1 |
| 6,749,254 B1 * | 6/2004 | Kleven et al. ............ | 296/191 |
| 6,821,605 B2 * | 11/2004 | Fiorinelli et al. ......... | 428/159 |
| 6,846,038 B1 * | 1/2005 | White et al. ............ | 296/193.11 |
| 6,883,627 B1 * | 4/2005 | Staines et al. ............ | 180/69.2 |
| 7,059,665 B2 * | 6/2006 | Murai et al. ............ | 296/181.2 |
| 7,140,672 B2 * | 11/2006 | Chernoff et al. ........ | 296/192 |
| 7,195,307 B2 * | 3/2007 | Tucker et al. .......... | 296/190.05 |
| 7,222,687 B2 * | 5/2007 | Smith et al. ............ | 180/69.21 |
| 7,228,829 B1 * | 6/2007 | Louie ..................... | 123/90.15 |
| 7,341,298 B2 * | 3/2008 | Jones ..................... | 296/29 |
| 7,390,055 B2 * | 6/2008 | Tsushima et al. ...... | 296/193.11 |
| 7,488,031 B2 * | 2/2009 | Ishitobi ................. | 296/193.11 |
| 2002/0008408 A1 * | 1/2002 | Tilsner et al. ........... | 296/194 |

(Continued)

OTHER PUBLICATIONS

International Search Report Relating to International Application No. PCT/US2007/076765 Dated Dec. 3, 2007.

*Primary Examiner*—Glenn Dayoan
*Assistant Examiner*—Gregory Blankenship (57) ABSTRACT

The present invention provides a truck hood including a metal hood skin including at least an upper portion and a sidewall portion; and a frame supporting at least a portion of the metal hood skin including polymer and aluminum reinforcements. The polymer reinforcements include a front hood stiffener member positioned at a front end portion of the metal hood skin, a rear hood stiffener member positioned at a rear end portion of the metal hood skin and hood corner longitudinal members connecting the front hood stiffener member to the rear hood stiffener member. The aluminum reinforcements include front and rear frame extruded members positioned along the sidewalls of the metal hood skin and an arch extruded reinforcement positioned at the wheel arch. In one aspect of the invention, the truck hood further includes a pair of fenders formed of a metal skin that may be reinforced by a polymer fender mat.

13 Claims, 13 Drawing Sheets

U.S. PATENT DOCUMENTS

| | | |
|---|---|---|
| 2003/0098192 A1 | 5/2003 | Brown et al. |
| 2003/0107241 A1* | 6/2003 | Ritchie et al. ............... 296/188 |
| 2005/0161979 A1 | 7/2005 | Chernoff et al. |
| 2005/0184560 A1 | 8/2005 | Yiu |
| 2006/0086551 A1* | 4/2006 | Cleland et al. ............. 180/69.2 |
| 2006/0175104 A1* | 8/2006 | Etzler et al. ................. 180/69.2 |
| 2006/0249988 A1* | 11/2006 | Jones .................... 296/193.11 |
| 2007/0257518 A1* | 11/2007 | Matsushima et al. ... 296/193.11 |
| 2008/0048471 A1* | 2/2008 | Seksaria et al. ........ 296/193.11 |
| 2008/0211242 A1* | 9/2008 | Schmidt et al. .............. 293/155 |
| 2008/0272518 A1* | 11/2008 | Steiner et al. ............... 264/323 |

* cited by examiner

LIGHTWEIGHT HYBRID MATERIAL TRUCK HOOD

FIELD OF THE INVENTION

The present invention relates to the lightweight truck hoods. More specifically, the invention provides a truck hood made from aluminum and having reinforcement members that may be made from polymers and aluminum.

BACKGROUND OF THE INVENTION

Vehicles in general, and trucks in particular, are always in need of improved fuel efficiency. Such improved fuel efficiency may be achieved by making the vehicles out of more lightweight components. However, the strength and structural integrity of the components must be maintained as their weight is reduced. Additionally, reduced weight is desirable in components that must be raised to service the vehicle, or to access other interior portions of the vehicle, for example the vehicle's hood.

Many presently available truck hoods are made from either sheet metal or polymer fiber composites. Hoods made from sheet metal typically include several components added to the hood panel itself to provide structural support and durability. These components increase the weight and cost of manufacture of the hood.

Fiberglass reinforced plastic (composite) hoods require slow, labor intensive manufacturing processes. More specifically, manufacturing of fiberglass reinforced plastic hoods typically includes the steps of providing a wooden mold, spraying a fiberglass media into the mold, and then applying a polymer resin. Each of these steps are manual labor intensive steps resulting in high production time for a singular hood. Such composite hoods must often be thicker, typically on the order of 6.0 mm or greater, to provide the required strength.

To provide the required strengths in fiberglass reinforced plastic (composite) hoods, the steps of spraying the fiberglass media and applying the polymer resin are repeated, which in turn results in increased weight. Additionally, components such as truck hoods are produced in relatively small volumes, and in several configurations. The low production volume limits the number of manufacturing and assembly processes that are economically viable.

FIGS. 1-5 illustrate a typical reinforcement structure presently used with fiberglass reinforced plastic truck hoods. The reinforcement structure 10 is formed of fiberglass reinforced plastic and includes a front reinforcement 12 having a generally rectangular configuration, defined by the top 14, bottom 16, and sides 18, 20. The right side 18 and left side 20 each define a headlight reinforcement portion 22, 24, respectively, extending outward therefrom. The remainder of the headlight reinforcement is a separate piece, with the left side headlight reinforcement 26 illustrated in FIG. 3, and the right side headlight reinforcement being a mirror image of the left side reinforcement 26.

Figure 1:
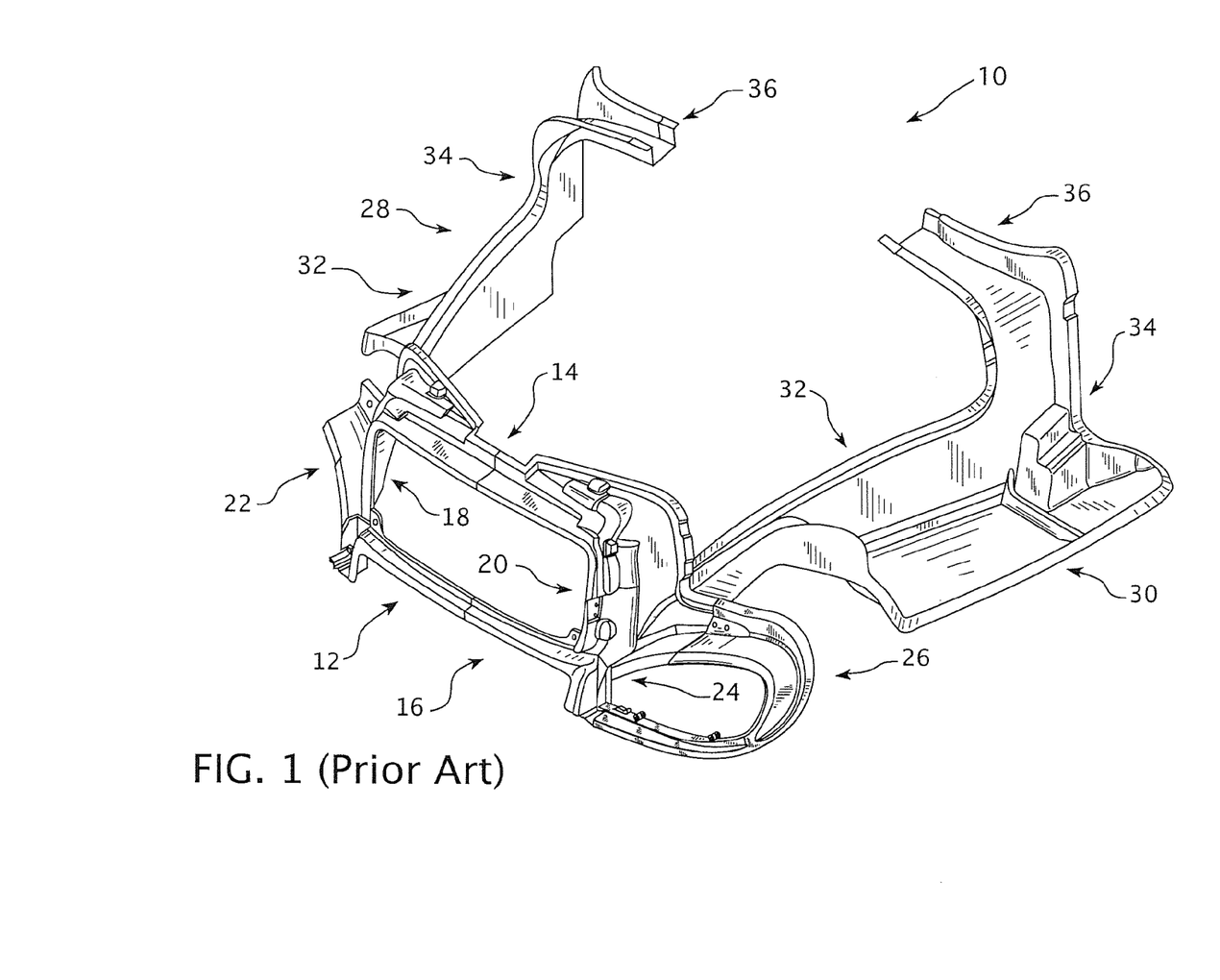
FIG. 1 is a perspective view of the reinforcements presently utilized with fiberglass reinforced polymer truck hoods, as known in the prior art.
Figure 2:
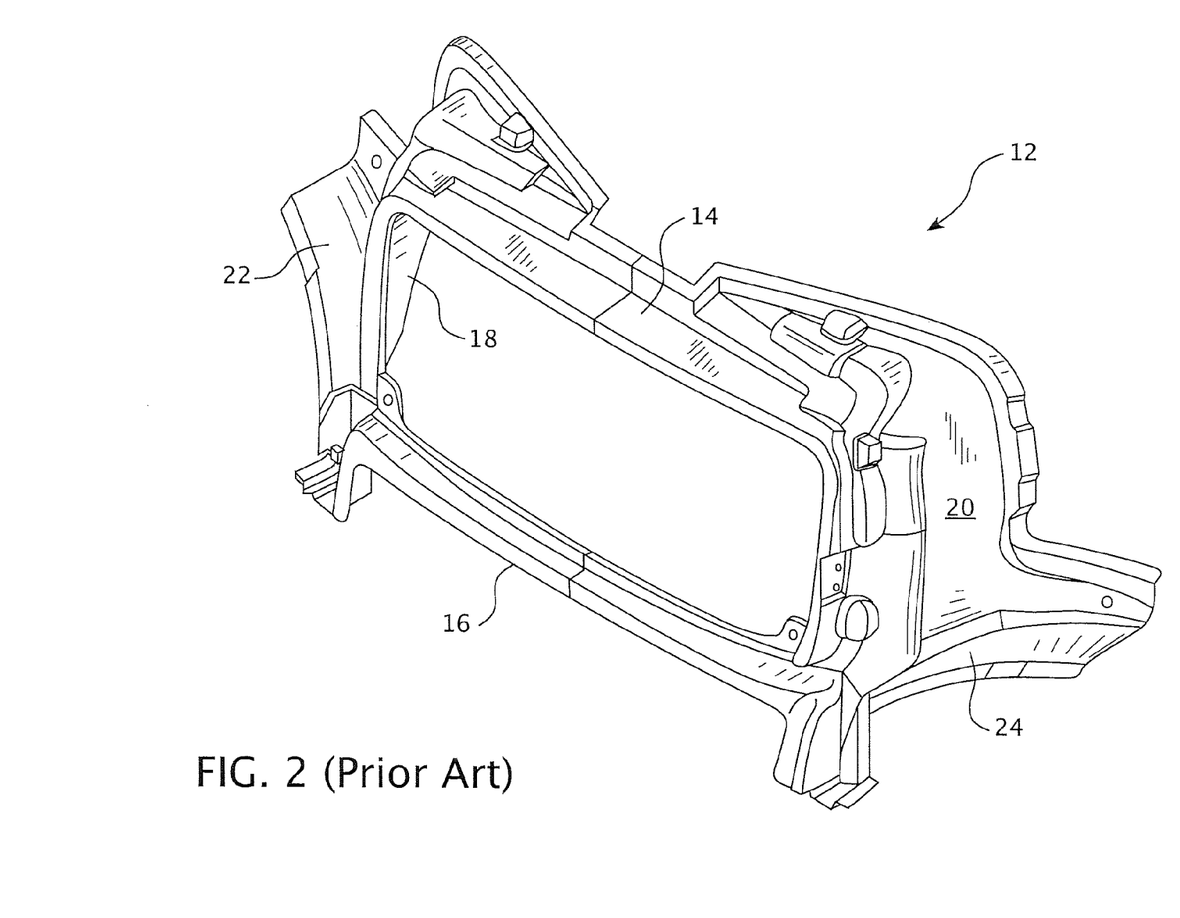
FIG. 2 is a perspective view of a front reinforcement presently used with fiberglass reinforced polymer truck hoods as known in the prior art.
Figure 3:
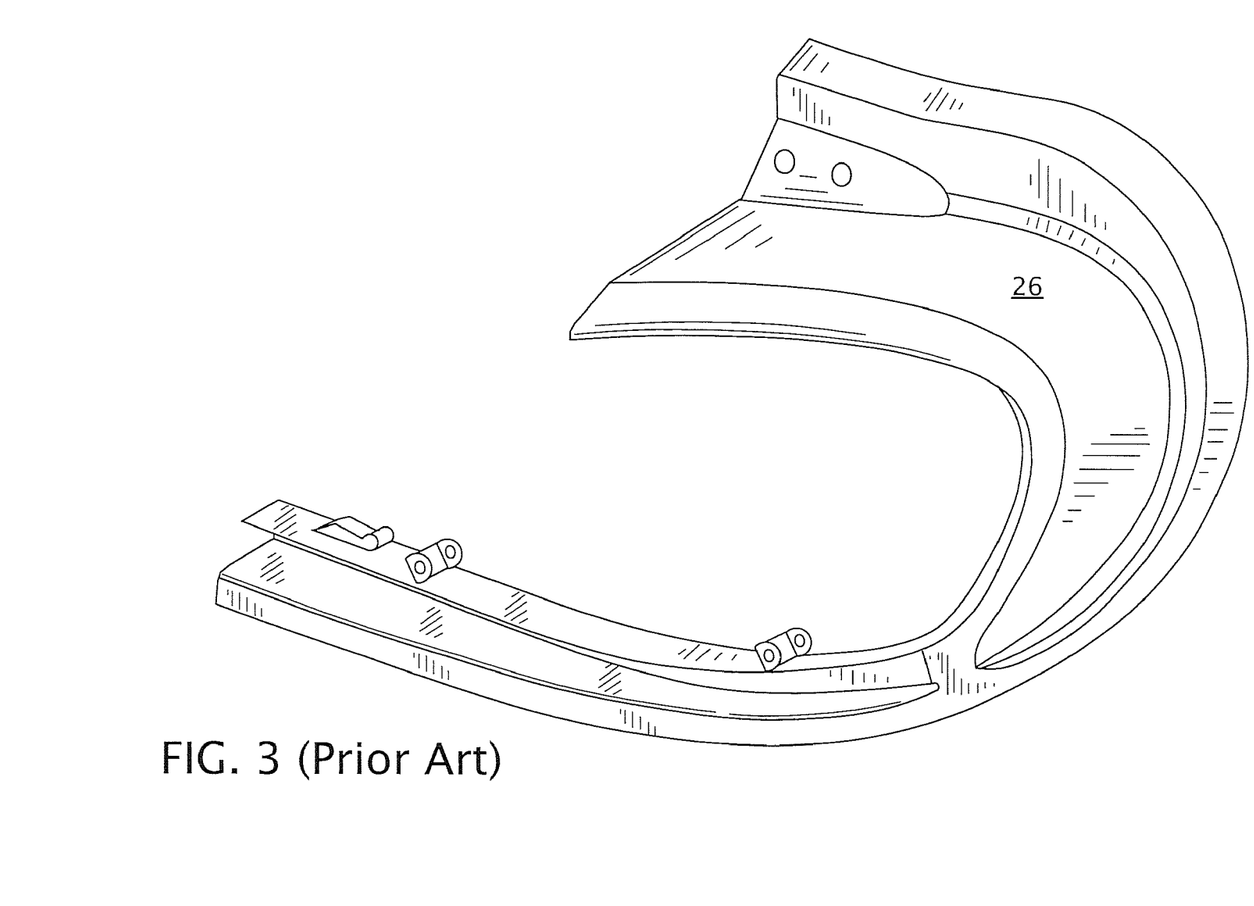
FIG. 3 is a perspective view of a headlight reinforcement presently used with fiberglass reinforced polymer truck hoods as known in the prior art.
Figure 4:
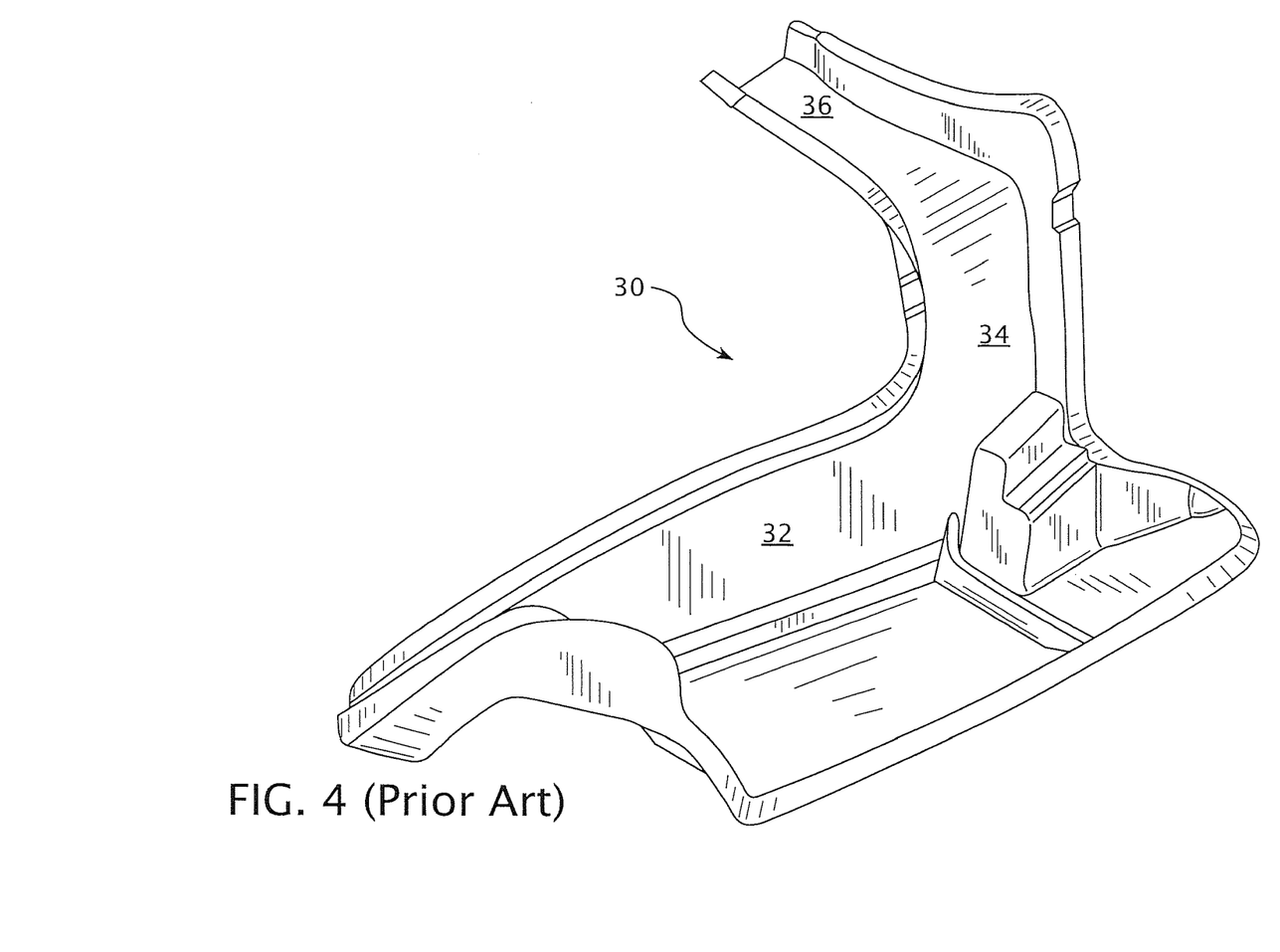
FIG. 4 is a perspective view of a side reinforcement presently used with fiberglass reinforced polymer truck hoods as known in the prior art.
Figure 5:
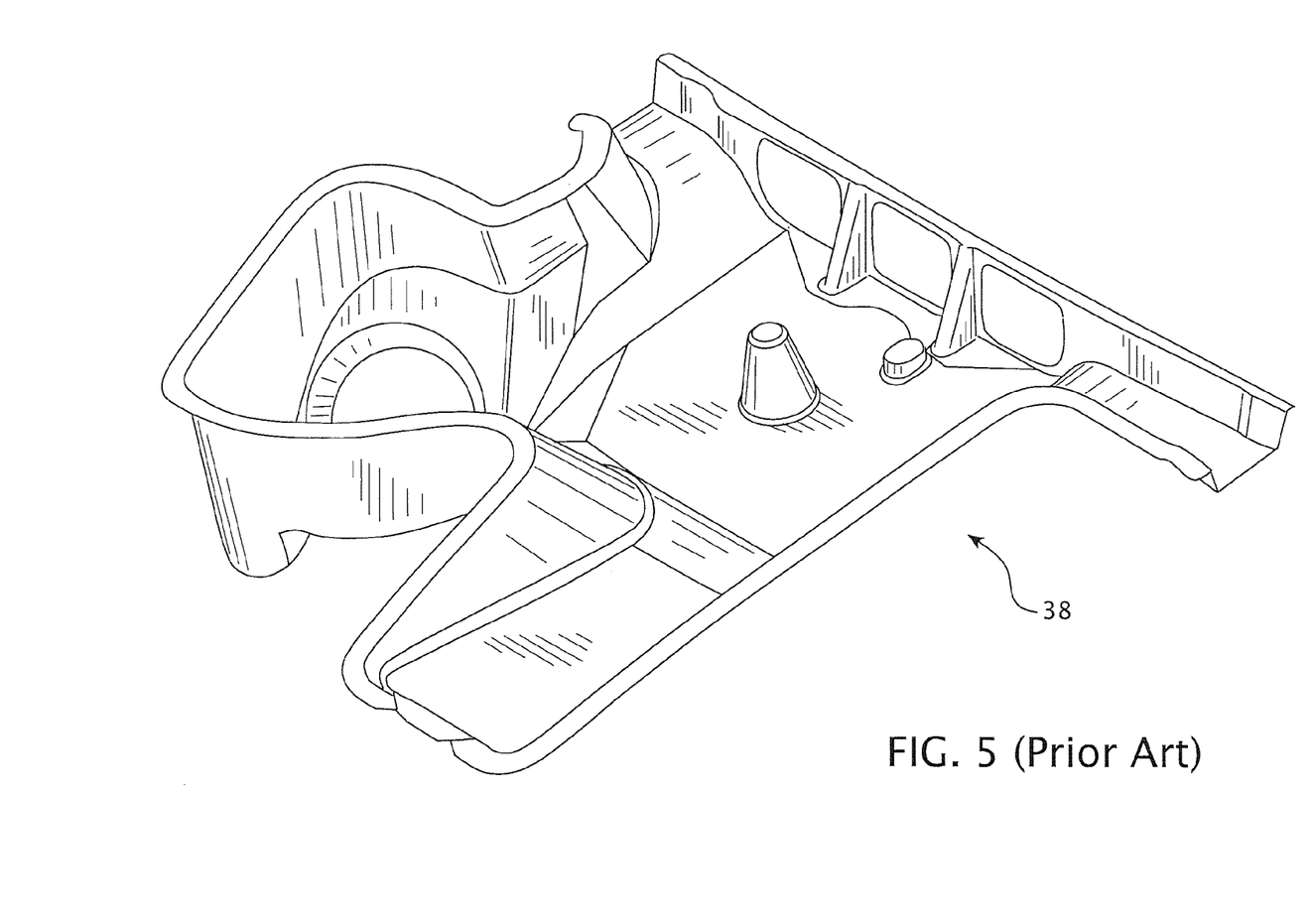
FIG. 5 is a perspective view of a plenum presently used with fiberglass reinforced polymer truck hoods as known in the prior art.

A right side reinforcement 28 and left side reinforcement 30 extend rearward from the front reinforcement 12. The right side reinforcement 28 is a mirror image of the left side reinforcement 30. Each of the left side reinforcement 30 and right side reinforcement 28 includes a rearwardly extending portion 32, corresponding to the lower side edges of the hood, a vertical portion 34 extending upward from the back end of the rearwardly extending portion 32, and a top portion 36 extending horizontally from the vertical portion 34, and corresponding to the top rear edge of the hood. Presently available hoods may also include a plenum 38, for reinforcing an air intake located on the top of the hood, and leading to the engine, as depicted in FIG. 5.

Such presently available fiberglass reinforced plastic truck hoods therefore require a large number of reinforcements to properly strengthen the hood, thereby increasing weight, cost, and the time required to manufacture the hood.

In light of the above, there is a need for a truck hood or other vehicle component having lighter weight than presently available components, while maintaining sufficient strength. There is a further need for a truck hood or other vehicle components that may be manufactured by relatively inexpensive manufacturing methods. Such a vehicle component will not only be more cost effective to manufacture, but will decrease the costs associated with operating the vehicle upon which it is installed.

SUMMARY OF THE INVENTION

Generally speaking, the present invention provides a vehicle body component such as a truck hood having a metal skin reinforced by a plurality of polymer and metal reinforcements secured to the interior of the skin.

The truck hood including:
a metal hood skin including at least an upper portion and a sidewall portion; and
a frame supporting at least a portion of the metal hood skin, the frame including a polymer reinforcement secured to an interior side of the hood skin, the polymer reinforcement including a front hood stiffener member positioned at a front end portion of the metal hood skin, a rear hood stiffener member positioned at a rear end portion of the metal hood skin and hood corner longitudinal members connecting the front hood stiffener member to the rear hood stiffener member and positioned along at a transition between the upper portion and sidewall portion of the metal hood skin.

In one embodiment, the metal skin may be formed of two skin portions secured to each other, a first hood skin portion including the upper and sidewall portions of the metal hood skin and a second hood skin portion including a pair of fenders.

In one embodiment, the truck hood further includes an arch extruded reinforcement (also referred to as arch extrusion), preferably being aluminum, reinforcing the connection between the first hood skin portion including the upper and sidewall portions of the metal hood skin and second hood skin portion including a pair of fenders. The arch extruded reinforcement may have a geometry corresponding to the wheel arch of a wheel well.

In one embodiment, the truck hood may further include front frame and rear frame extruded members, preferably being aluminum, positioned to support at least the sidewall portion of the metal hood skin. The front and rear frame extruded member form a triangular truss structure with a base provided by the arch extruded reinforcement and with an apex connected to the hood corner longitudinal members. The truck hood may further include a node casting, preferably composed of aluminum, at the apex of the front and rear extruded members including a spring attachment member; a rear hood support casting connected to the rear extruded member; and a pivot member casting connected to the arch extruded member and positioned at the front end portion of the metal hood skin.

In another aspect of the present invention, a method of forming a truck hood is provided, in which a polymer reinforcement supports at least a portion of the truck hood skin. The method including:

forming a metal sheet into a truck hood skin;
providing a frame including at least one polymer reinforcement supporting at least a portion of the metal hood skin; and
securing the frame to the metal skin.

BRIEF DESCRIPTION OF THE DRAWINGS

The following detailed description, given by way of example and not intended to limit the invention solely thereto, will best be appreciated in conjunction with the accompanying drawings, wherein like reference numerals denote like elements and parts, in which.

DETAILED DESCRIPTION OF PREFERRED EMBODIMENTS

Figure 6:
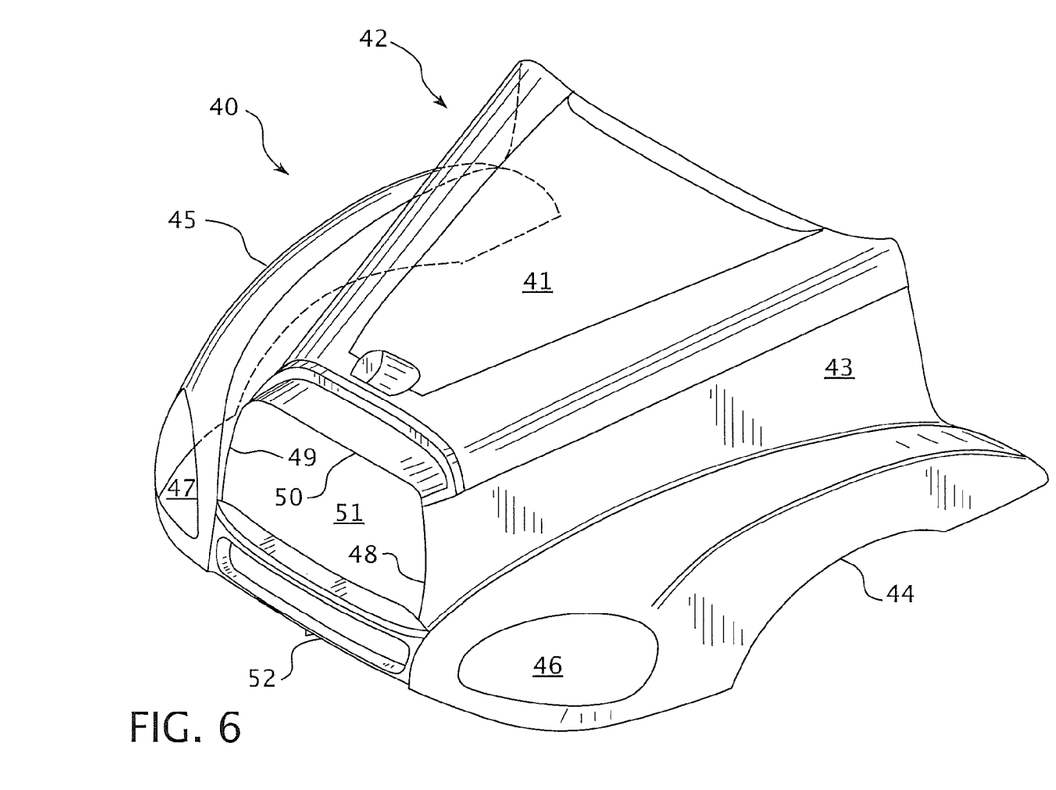
FIG. 6 is a perspective view of one preferred embodiment of a truck hood in accordance with the present invention, in which the lower hood panel of the truck hood is included so that it may be made in the same color as the remainder of the truck hood.

FIG. 6 depicts one embodiment of a truck hood 40 in accordance with the present invention. Preferably, the truck hood 40 is to be employed in long haul trucks, such as Class 8 truck applications. The truck hood 40 includes a hood skin having a top or upper surface 41, a right sidewall 42 joined to the upper surface 41, and a left sidewall 43 joined to the other side of the upper surface 41. The upper surface 41 and sidewalls 42, 43 of the metal hood skin may be made from any metal having suitable strength and weight, with preferred metals including aluminum, such as Aluminum Association 3XXX, 5XXX or 6XXX series aluminum alloy sheet, preferably having a thickness of about 1.5 mm to about 2.5 mm. The metal skin is preferably formed into a desired shape by any sheet metal forming process, such as stamping.

Fender skin structures 44, 45 may be formed integrated into the sidewall portions 42, 43 of the hood skin to provide a singular structure or may be detachably connected to the sidewall portions 42, 43 of the hood skin. Each of the fender skin structures 44, 45 may include a headlight opening 46, 47 therein. The sidewall portions 42, 43 and fender structures 44, 45 may be joined by presently available methods such as spot welding, other forms of welding, or other forms of mechanical fastening, such as nut and bolt arrangements and riveting.

Figure 7:
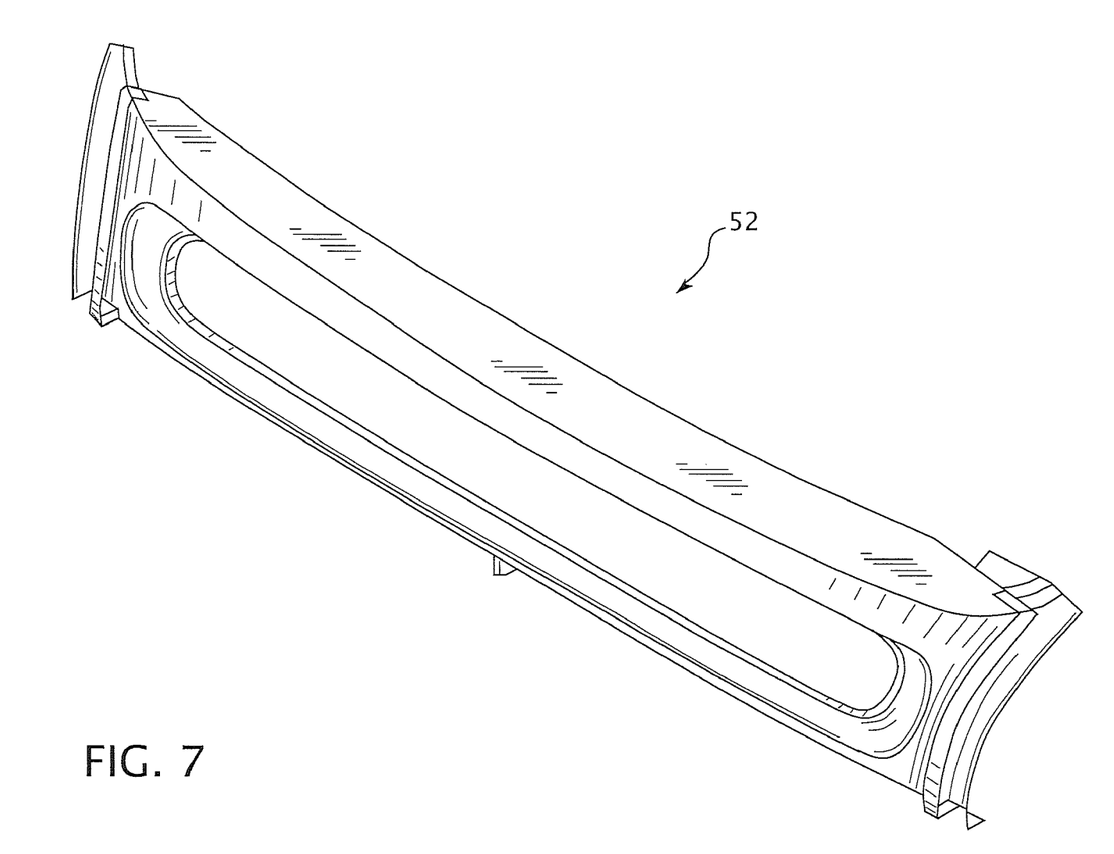
FIG. 7 is a perspective view of a lower hood panel, in accordance with the present invention.

In one embodiment, the front edges 48, 49 of the sidewalls 42, 43, along with the front edge 50 of the top surface 41, define a space 51 structured to receive a grille. In the embodiment of FIG. 6, a front panel 52 is also included so that it may be made in the same color as the remainder of the truck hood 40. One embodiment of a front panel 52 is depicted in FIG. 7. The front panel 52 may be connected between the opposing lower front corners of the fender skin structures 44, 45 by mechanical attachment, including nut and bolt arrangements, rivets and combinations thereof.

Figure 8:
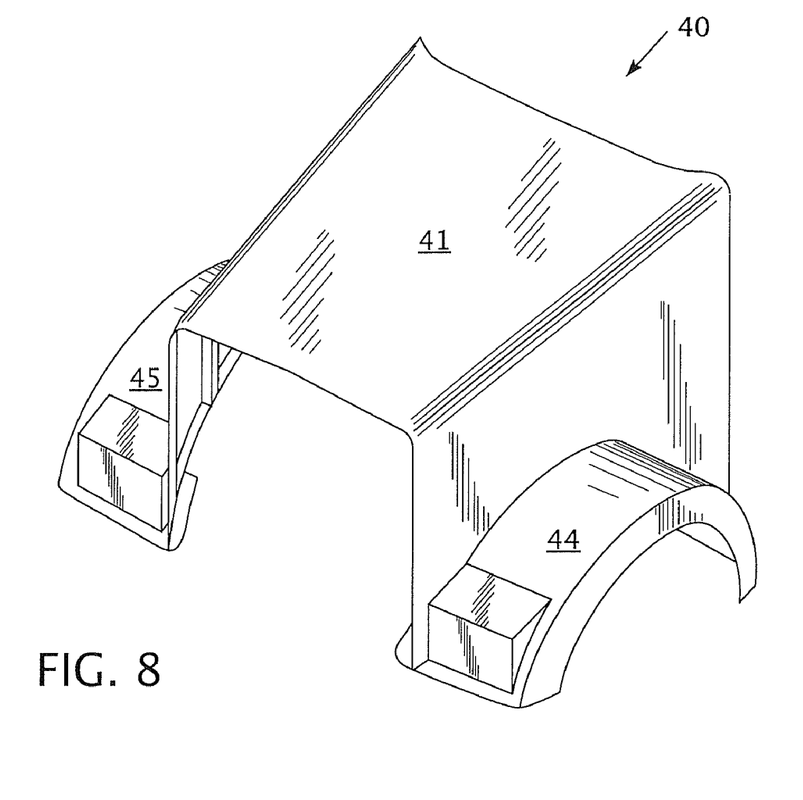
FIG. 8 is a perspective view of another preferred embodiment of a truck hood in accordance with the present invention, in which the lower hood panel is omitted so that it may be provided as part of the grille.

FIG. 8 depicts another embodiment of a hood structure 40 provided in accordance with the present invention, in which the front panel is omitted so that it may be provided as part of the grille, and may have the same finish or chrome plating as the grille.

Figure 9:
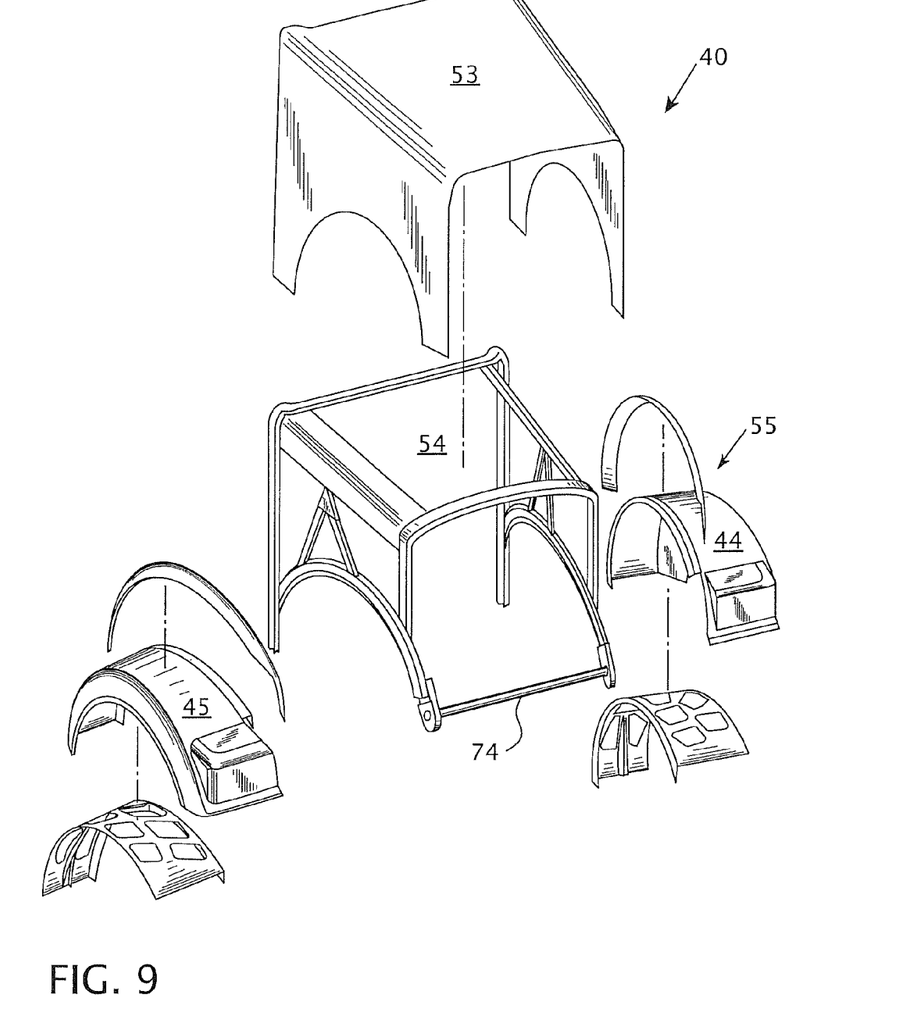
FIG. 9 is an exploded view of a truck hood in accordance with the present invention.

FIG. 9 depicts an exploded view of one embodiment of a hood structure 40, in accordance with the present invention. The hood structure 40 includes a metal hood skin 53, a frame 54 supporting at least a portion of the metal hood skin 53, and a reinforced fender assembly 55.

Figure 10:
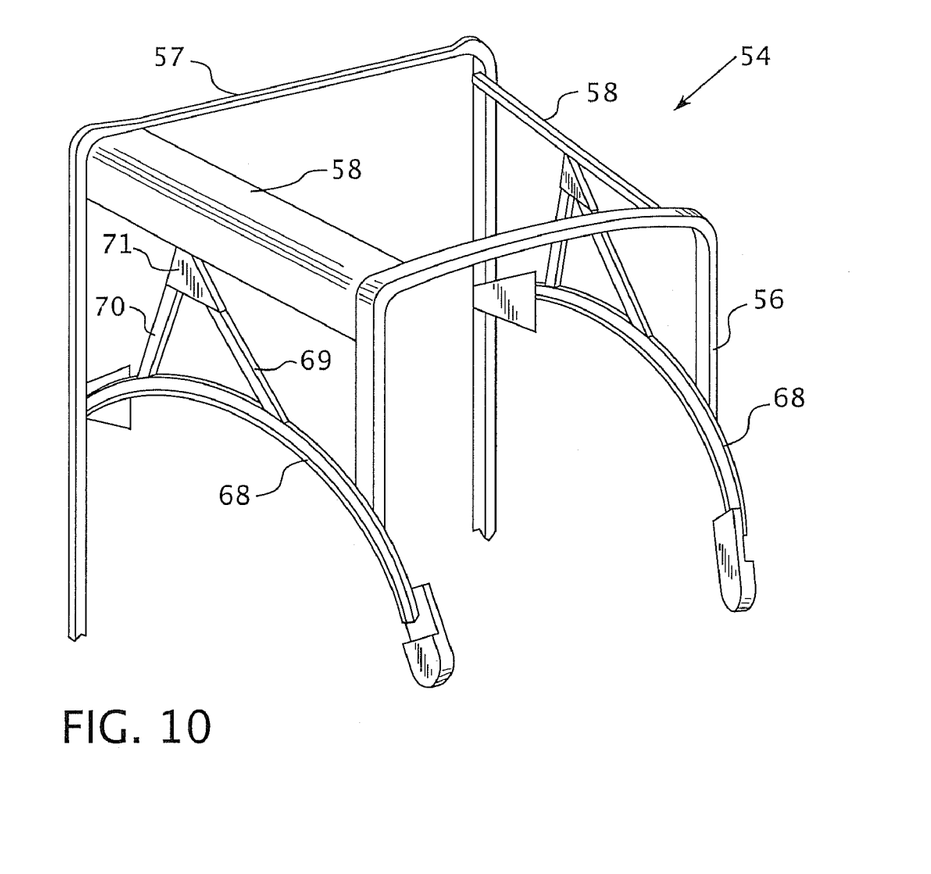
FIG. 10 is a perspective view of one embodiment of a truck hood reinforcing structure in accordance with the present invention.

FIG. 10 depicts one embodiment of a frame 54 for supporting at least a portion of the metal hood skin 53. In one embodiment, the frame 54 includes a polymer reinforcement secured to the interior side of the hood skin 53, in which the polymer reinforcement includes a front hood stiffener member 56 positioned corresponding to a front end portion of the metal hood skin 53, a rear hood stiffener member 57 positioned corresponding to a rear end portion of the metal hood skin 53 and hood corner longitudinal members 58 connecting the front hood stiffener member 56 to the rear hood stiffener member 57 and positioned corresponding to the transition between the upper surface 41 and sidewall portions 42, 43 of the metal hood skin 53. In one embodiment, the front hood stiffener member 56 and the rear hood stiffener member 57 have a generally U-shaped geometry corresponding to the interior surface of the metal hood skin 53.

Figure 11:
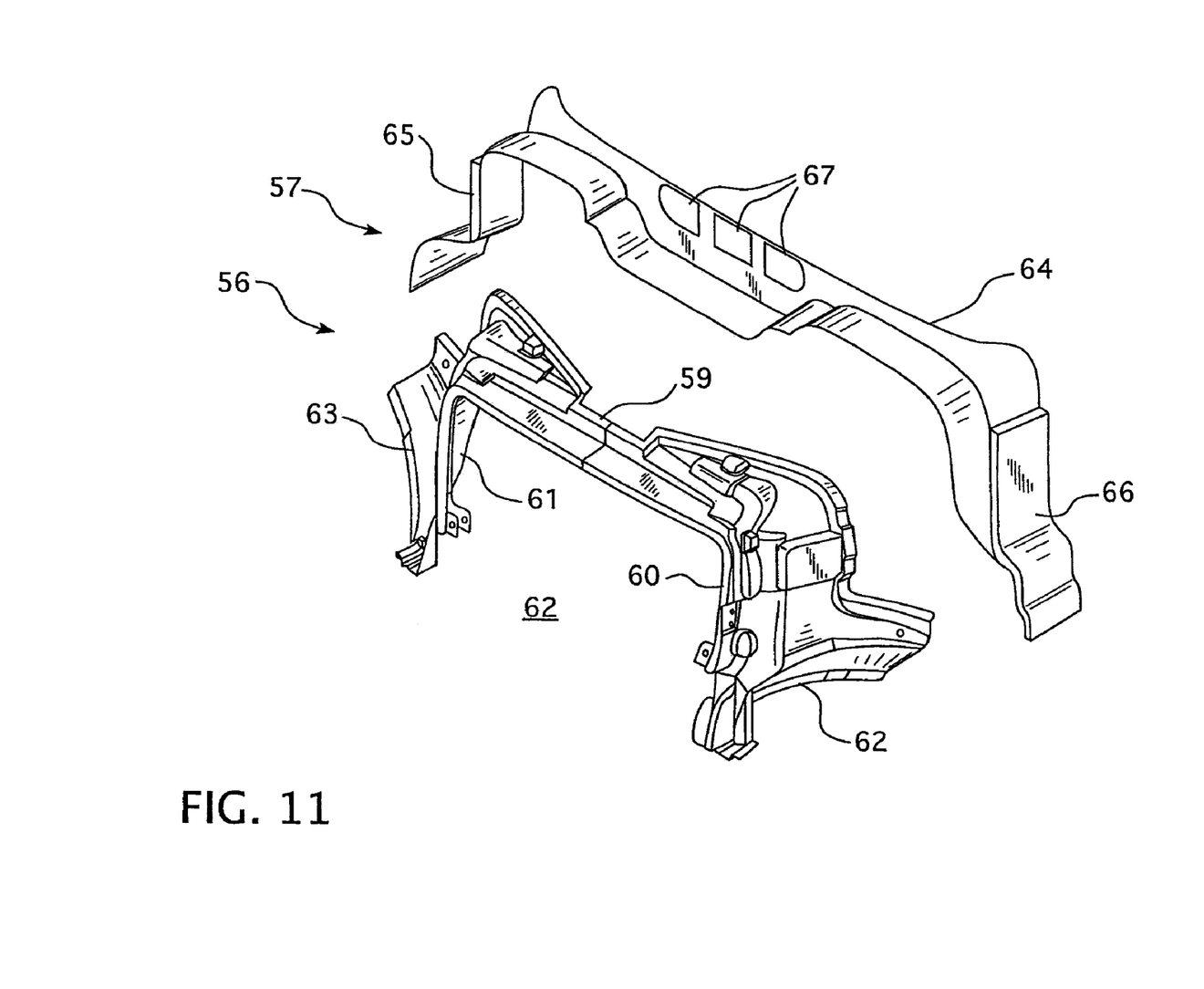
FIG. 11 is a perspective view of one embodiment of the front hood stiffener member and rear hood stiffener member of the polymer reinforcement and one embodiment of a pivot cast member, in accordance with the present invention.

Referring to FIG. 11, one preferred polymer reinforcement front hood stiffener member 56 includes a top portion 59 having a left side portion 60 and a right side portion 61 depending downward therefrom. The top portion 59, left side portion 60, and right side portion 61 define an opening 62 therein, structured to receive a grille. The left side portion 60 and right side portion 61 each includes a headlight support portion 62, 63, preferably in a lower portion of the left side portion 60 and right side portion 61. One preferred polymer reinforcement rear hood stiffener member 57 includes top portion 64 having a right side portion 65 and left side portion 66 depending downward therefrom. In one embodiment, the right side portion 65 and left side portion 66 of the rear hood stiffener member 56 have an increased thickness corresponding to the portions of the metal hood skin 53 requiring additional reinforcement. The rear hood stiffener member 57 may further include plurality of vents 67 defined in the center of the top portion 64.

Referring to FIG. 10, the hood corner longitudinal members 58 connecting the front hood stiffener member 56 to the rear hood stiffener member 57 are positioned corresponding to the transition between the upper surface 41 and sidewall portions 42, 43 of the metal hood skin 53. In one embodiment, the hood corner longitudinal member 58 is configured to provide the base of a triangle formed between the hood longitudinal member 58, the upper surface 41 of the metal skin 53, and the sidewall 42, 43 of the metal skin in a manner that reinforces the transition between the upper surface 41 and the sidewalls 53. Preferably, the front hood stiffener member 56 and the rear hood stiffener member have a thickness on the order of about 3.0 mm.

The polymer reinforcements, including the front hood stiffener member 56, rear hood stiffener member 57, and hood corner longitudinal members 58, may be made from any suitable polymer, with suggested materials including thermoplastic and thermoset sheet, thermoplastic and thermoset molding pellet, as well as sheet molding compounds. In one highly preferred embodiment, the polymer includes nylon containing polymers, one preferred polymer including greater than 50.0 weight % polyhexamethylene adipamide (nylon 66), greater than 30.0 weight % inert filler, less than 3.0 weight % carbon black, less than 3.0 weight % titanium dioxide, and less than 1.0 weight % of colorants, lubricants and stabilizers. Another preferred polymer includes than 60.0 weight % polyhexamethylene adipamide (nylon 66), greater than 30.0 weight % inert filler, less than 1.0 weight % carbon black, and less than 15.0 weight % of short glass fibers. Another preferred polymer is Minlon™ available from Dupont Inc.

The polymer reinforcements may be formed from processes such as molding and vacuum thermoforming, with vacuum thermoforming being most preferred for low volume production. The polymer reinforcements may be attached to the metal skin by either mechanical fasteners or by adhesives. Preferably, the polymer reinforcements occupy about 20% to about 30% of the interior surface area of the truck hood 40, and comprise about 25% to about 35% of the total weight of the truck hood 40.

Referring to FIG. 10, in one embodiment, the frame 54 may further include an arch extruded reinforcement 68, preferably of aluminum, reinforcing a connection between the metal hood skin 53 and the reinforced fender structure 55, wherein the arch extruded reinforcement 68 corresponds to the wheel arch of a wheel well. Preferably, the arch extruded reinforcement 68 is formed of a 6XXX series aluminum, most preferably being an extrusion of Aluminum Association 6061-T6. For the purposes of this disclosure, the term "extrusion" is meant to define that the member is made using an extrusion process, in which the extrusion has a substantially uniform cross section dictated by the extrusion die. In one embodiment, the arch extruded reinforcement 68 has a thickness on the order of about 2.0 mm.

In one embodiment of the present invention, the frame 54 further includes front frame and rear frame extruded members 69, 70, preferably of aluminum, positioned to support at least the sidewall portion 42, 43 of the metal hood skin 53. The front and rear frame extruded member 69, 70 form a triangular structure with a base provided by the arch extruded reinforcement 68 and with an apex 71 connected to the hood corner longitudinal members 58. Preferably, the front frame and rear frame extruded members 69, 70 are formed of a 6XXX or 5XXX series aluminum, most preferably being an extrusion of Aluminum Association 6061-T6. In one embodiment, the arch extruded reinforcement 68 has a thickness on the order of about 2.0 mm.

Figure 12:
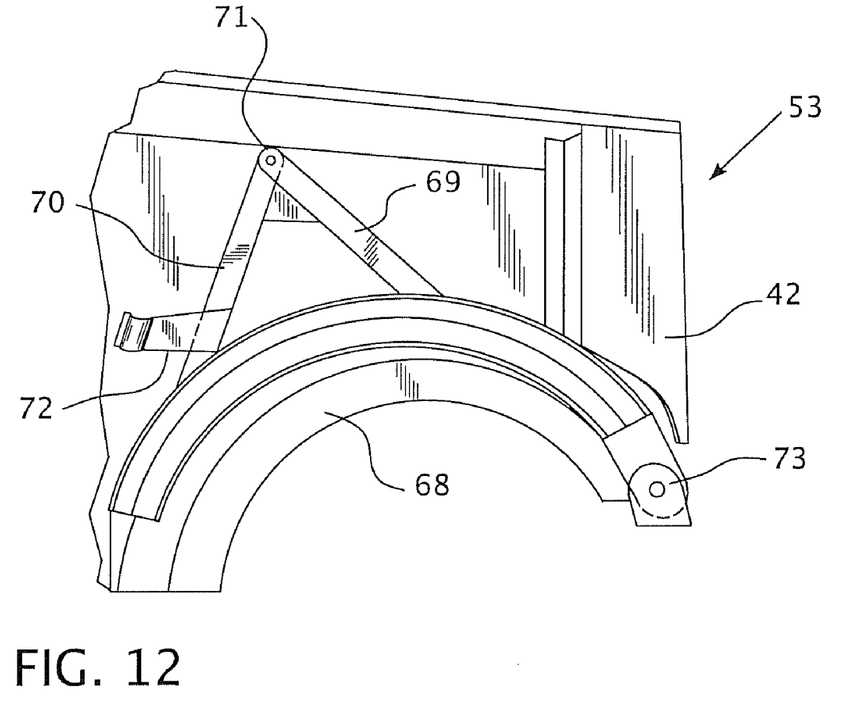
FIG. 12 is an interior side view of the sidewall portion of one embodiment of a truck hood in accordance with the present invention.

FIG. 12 is an interior side-view of the sidewall 42 portion of one embodiment of the inventive truck hood and depicts the portion of the frame 54 that supports at least the sidewalls 42 of the metal skin 53. The portion of the frame 54 supporting the sidewalls 42 includes at least the front and rear frame extruded member 69, 70.

In one embodiment, the truck hood 40 further includes a node 71 at the apex of the front and rear extruded members 69, 70 including a spring attachment member. Preferably, the node 71 is formed from a metal sheet, preferably including a 5XXX or 6XXX series alloy, such as Aluminum Association 6061 treated to T4 temper. Alternatively, the node 71 is a casting of Aluminum Association A356-T6. In one embodiment, the truck hood 40 further includes a rear hood support casting 72 connected to the rear extruded member 70. The rear hood support casting 72 is configured to act a support for the truck hood 40 when in the closed position. Preferably, the rear hood support casting 72 is cast from a 3XX series alloy, such as Aluminum Association A356-T6.

In one embodiment, the truck hood 40 further includes a pivot member casting 73 connected to the arch extruded reinforcement 68 and positioned at the front end portion of the metal hood skin 53. The pivot casting 73 may be of any geometry that would support the operation weight of the hood 40 when open and closed. Preferably, the pivot member casting 73 is cast from a 3XX series alloy, such as Aluminum Association A356-T6. In one embodiment, the truck hood 40 may include a cross brace 74 positioned between the pivot member castings 73, wherein the cross brace 74 is preferably an extruded aluminum member, as depicted in FIG. 9. In a preferred embodiment, the cross brace 74 is extruded of an Aluminum Association 6XXX alloy, most preferably being Aluminum Association 6061-T6.

Figures 13A, 13B:
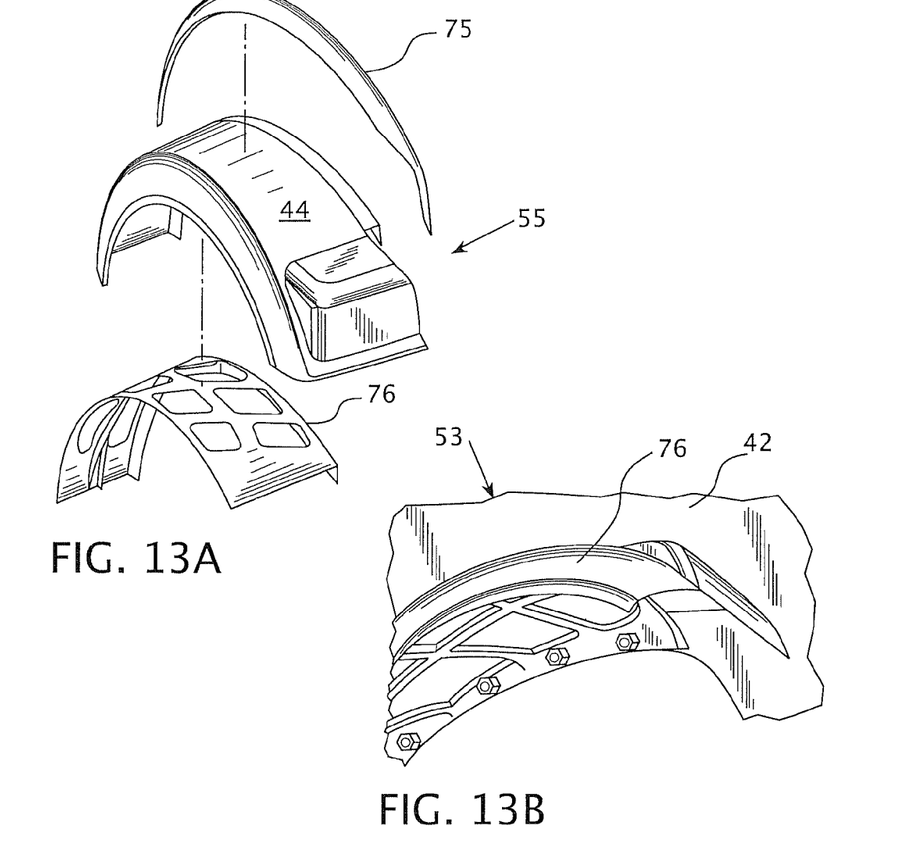
FIGS. 13a-13b are perspective views of the connection between the first portion of the hood skin and the second portion of the hood skin, in which the second portion of the hood skin includes fenders.
Figure 13C:
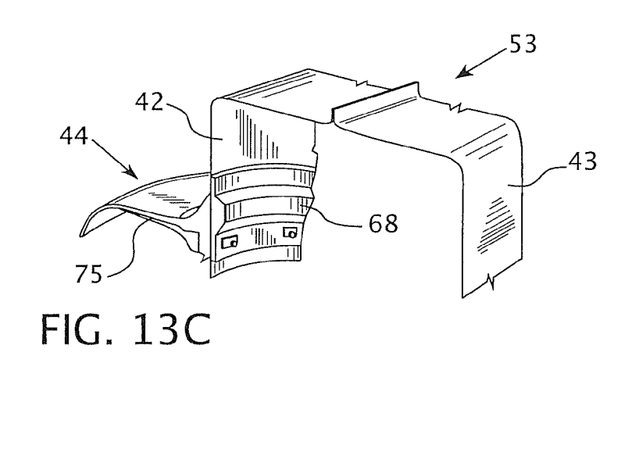
FIG. 13c is a section view of a truck hood and fender structure in accordance with the present invention.

FIGS. 13A-13C, depict one embodiment of a reinforced fender structure 55, in which the connection between the metal hood skin 53 and the fender structure 55 is strengthened by the arch extruded reinforcement 68. In one embodiment, the reinforced fender structure 55 includes fender skin structures 44, 45, a weatherstrip component 75 and a reinforcing fender mat 76.

Preferably, the fender skin structures 44, 45 include a stamped metal skin and may be made from any metal having suitable strength and weight, with preferred metals including 3XXX, 5XXX or 6XXX series aluminum alloy sheet having a thickness of about 1.5 mm to about 2.5 mm, preferably being 2.0 mm. The metal fender skin structures 44, 45 are preferably formed into a desired shape by any sheet metal forming process such as stamping. The weatherstrip component 75 is preferably a polymer material, such as Polyvinyl chloride (PVC).

The reinforcing fender mat 76 may be formed, preferably molded, from any suitable polymer, with suggested materials including thermoplastic and thermoset sheet, thermoplastic and thermoset molding pellet, as well as sheet molding compounds. In one highly preferred embodiment, the polymer of the reinforced fender mat 76 includes nylon containing polymers, one preferred polymer including greater than 50.0 weight % polyhexamethylene adipamide (nylon 66), greater than 30.0 weight % inert filler, less than 3.0 weight % carbon black, less than 3.0 weight % titanium dioxide, and less than 1.0 weight % of colorants, lubricants and stabilizers. Another preferred polymer includes than 60.0 weight % polyhexamethylene adipamide (nylon 66), greater than 30.0 weight % inert filler, less than 1.0 weight % carbon black, and less than 15.0 weight % of short glass fibers. Another preferred polymer is Minlon™ available from Dupont Inc. The polymer reinforcing fender mat 76 may be formed from processes such as molding and vacuum thermoforming and may have a thickness on the order of 5.0 mm.

Referring to FIG. 13B, in one embodiment, the reinforced fender structure 55 is connected to the sidewalls 42, 43 of the truck hood 40 by engagement between the polymer reinforcing fender mat 76 and the sidewall portions 42, 43. The engagement between the polymer reinforcing fender may 76 and the sidewall portions 42, 43 may be provided by mechanical attachment, including nut and bolt arrangements, rivots and combinations thereof; by welding operations, such as spot welding; or adhesively.

Referring to FIG. 13C, in one embodiment, the engagement of the fender skin structure 44 and the polymer reinforcing mat 76 is strengthened by the arch extruded reinforcement 68, wherein the polymer reinforcing mat 76 is mechanically attached to the arch extruded reinforcement 68 through the sidewall portion 42, 43 of the hood skin 53. In one embodiment, the polymer weatherstrip 75 provides sealing engagement between first hood skin portion including the upper and sidewall portions 41, 42, 43 and the second hood skin portion including the fender skin structure 44, 45.

As compared to the prior art hood of FIGS. 1-5, the number of parts included in the truck hood 40 of the present invention has been reduced from 21 to 10, providing for a reduction in weight from about 167 lbs. to about 90 lbs. Part of this weight savings is derived from the decreased need to reinforce an aluminum skin as compared to a polymer skin. In one embodiment, it is only necessary for the polymer reinforcements to occupy about 20% to about 30% of the interior surface of the truck hood 40, 66, and to comprise about 25% to about 35% of the total weight of the truck hood 40, 66.

The present invention provides a truck hood having a better strength to weight ratio than presently available truck hood structures.

The present invention further provides a truck hood component that is inexpensive to manufacture using manufacturing methods that are cost effective for low volume production.

The present invention further provides a truck hood component that facilitates access to those portions of the vehicle that it covers by being easier to raise and lower due to its light weight.

The present invention also provides a vehicle body component made from fewer subcomponents.

What is claimed is:

1. A truck hood, comprising:
    a metal hood skin including at least an upper portion and a sidewall portion, wherein the metal hood skin comprises at least two skin portions secured to each other, a first hood skin portion including the upper and sidewall portions of the metal hood skin and a second hood skin portion including a pair of fenders, wherein the first hood skin portion and the second hood skin portion are connected by welds or mechanical fasteners;
    a frame supporting at least a portion of the metal hood skin, the frame including a polymer reinforcement secured to an interior side of the hood skin, the polymer reinforcement including a front hood stiffener member positioned at a front end portion of the metal hood skin, a rear hood stiffener member positioned at a rear end portion of the metal hood skin and hood corner longitudinal members connecting the front hood stiffener member to the rear hood stiffener member and positioned along at a transition between the upper portion and sidewall portion of the metal hood skin; and
    an arch extruded reinforcement reinforcing a connection between the first hood skin and second hood skin, wherein the arch extruded reinforcement corresponds to the wheel arch of a wheel well.

2. The truck hood component according to claim 1, wherein the metal skin is made from aluminum.

3. The truck hood component according to claim 1, wherein the polymer reinforcement comprises thermoplastic sheet, thermoset sheet, thermoset pellet, thermoplastic pellet, sheet molding compound or combinations thereof.

4. The truck hood component according to claim 1, wherein the arch extruded reinforcement comprises a 6XXX series aluminum.

5. The truck hood according to claim 1, further comprising a polymer weatherstrip in sealing engagement to the first hood skin portion and the second hood skin portion.

6. The truck hood according to claim 1, further comprising a polymer fender mat reinforcing the second hood skin component.

7. The truck hood according to claim 1, further comprising front frame and rear frame extruded members positioned to support at least the sidewall portion of the metal hood skin.

8. The truck hood according to claim 7, wherein the front and rear frame extruded member form a triangular structure with a base provided by the arch extruded reinforcement and with an apex connected to the hood corner longitudinal members.

9. The truck hood according to claim 8 wherein the front and rear frame extruded members comprises a 6XXX series aluminum.

10. The truck hood according to claim 8 further comprising a pivot member casting connected to the arch extruded reinforcement and positioned at the front end portion of the metal hood skin.

11. The truck hood according to claim 10, further comprising a node casting at the apex of the front and rear extruded members including a spring attachment member and a rear hood support casting connected to the rear extruded member.

12. The truck hood according to claim 11, wherein at least one of the node casting, the rear hood support casting, and the pivot member casting comprise a 3XX series aluminum alloy.

13. The truck hood according to claim 12, further comprising an extruded cross brace disposed between the pivot member castings.

* * * * *